United States Patent [19]

Kitano et al.

[11] Patent Number: 4,848,550
[45] Date of Patent: Jul. 18, 1989

[54] LOAD TRANSMISSION LEVER FOR PULL-TYPE CLUTCH

[75] Inventors: Seiichi Kitano, Shijonawate; Yasunobu Fukatani, Hirakata; Masaaki Asada, Ibaraki; Kazuhiko Yoneda, Hirakata, all of Japan

[73] Assignee: Kabushiki Kaisha Daikin Seisakusho, Osaka, Japan

[21] Appl. No.: 147,589

[22] Filed: Jan. 21, 1988

Related U.S. Application Data

[63] Continuation of Ser. No. 16,686, Feb. 19, 1987, abandoned.

[30] Foreign Application Priority Data

Feb. 20, 1986 [JP] Japan .................................. 61-36034

[51] Int. Cl.⁴ ....................... F16D 13/50; F16D 13/75
[52] U.S. Cl. ............................... 192/99 A; 192/70.3; 192/111 B

[58] Field of Search .............. 192/99 A, 99 R, 109 R, 192/70.3, 70.29, 70.25, 89 B, 111 B

[56] References Cited

U.S. PATENT DOCUMENTS

| | | | |
|---|---|---|---|
| 2,280,356 | 4/1942 | Spase et al. | 192/70.29 X |
| 2,682,943 | 7/1954 | Root | 192/99 A |
| 4,034,836 | 7/1977 | Sink et al. | 192/70.29 X |

Primary Examiner—Rodney H. Bonck
Assistant Examiner—Richard M. Lorence
Attorney, Agent, or Firm—Armstrong, Nikaido, Marmelstein, Kubovcik & Murray

[57] ABSTRACT

In a pull-type clutch which performs release operation through a load transmission lever disposed between a load transmission retainer and a pressure plate, the load transmission lever comprising protrusions provided on its base end portion at which the lever is in engagement with an annular groove of the retainer and projecting toward abutment surfaces of the groove.

8 Claims, 6 Drawing Sheets

LOAD TRANSMISSION LEVER FOR PULL-TYPE CLUTCH

This application is a continuation of application Ser. No. 016,686 filed Feb. 19, 1987, now abandoned.

BACKGROUND OF THE INVENTION

1. (Industrial Useful Field)

The invention relates to a clutch of the so-called pull type which performs releasing operation by pulling a release bearing toward a speed change gear by means of a release lever connected to a clutch pedal.

2. (Prior Art)

In a typical prior-art arrangement of this sort, as FIG. 6 shows, an inclined coil spring 100 is employed as a load generating member which acts on a retainer 102 to cause retainer 102 to transmit the biasing force of the spring 100 to a pressure plate 106 through a lever 104 so that the pressure plate 106 is pressed against a clutch disk 108 (Japanese Patent Publication No. 46-15046).

However, such arrangement has a drawback that since the base end portion of the lever 104 is flat shaped, there must be provided a comparatively large clearance δ in an annular groove 110 of the retainer 102 relative to the base end portion so as to allow adjustment during release operation and in the case of clutch disk wearing, which fact means a disadvantage from the standpoint of release efficiency.

(Object of the Invention)

The object of this invention is to provide a load transmission lever for a clutch of the so-called pull type which can help improve release efficiency.

(Structure of the Invention)

In order to accomplish this object, the invention consists in that in a pull-type clutch including a release lever connected to a clutch pedal and adapted to pull a release bearing away from a flywheel, a load transmission retainer provided on a sleeve fixed to the release bearing and at the flywheel-side end of the sleeve, and a load transmission lever or levers disposed between the retainer and a pressure plate and through which release operation is carried out, the load transmission lever comprises protrusions formed on its base end portion at which the load transmission lever is in engagement with an annular groove provided in the retainer, the protrusions projecting toward abutment surfaces of said annular groove with which said protrusions are adapted to be brought into pressure contact.

DETAILED DESCRIPTION OF THE INVENTION

(Embodiment 1)

Figure 1:
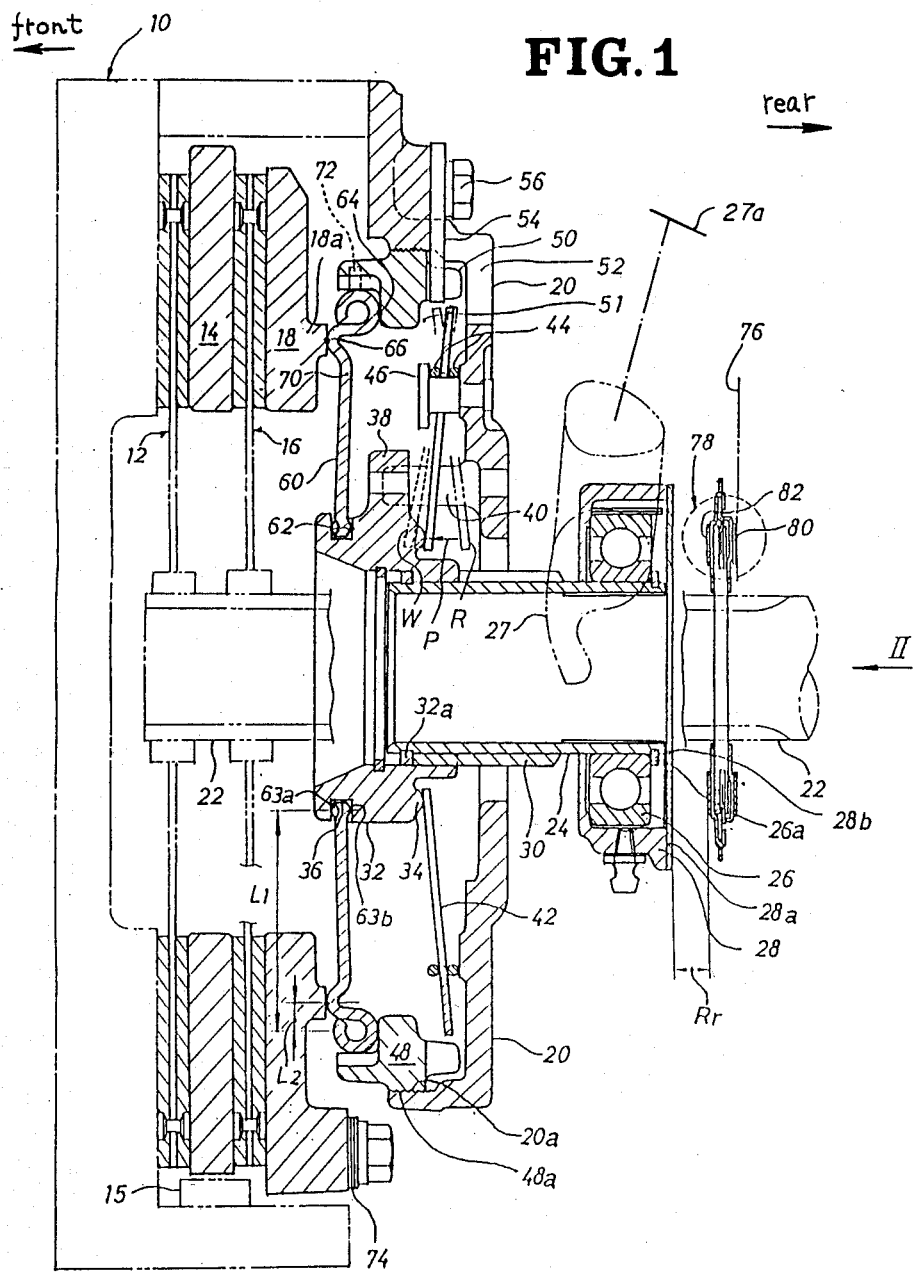
FIG. 1 is a longitudinal section showing a clutch to which one embodiment of this invention is applied.

In FIG. 1 which shows in longitudinal section a clutch in accordance with the invention (and in the A-O-A section of FIG. 2), numeral 10 designates a flywheel, against the back side of which a clutch disk 12, an intermediate plate 14, and a clutch disk 16 are pressed in order of mention by a pressure plate 18. Radially outwardly of the intermediate plate 14 there is provided a pin 15 fixed to flywheel 10 so that the flywheel 10 and the intermediate plate 14 are integrally rotatable by means of the pin 15.

A clutch cover 20 is provided behind the pressure plate 18 so as to cover the pressure plate 18, said clutch cover 20 being of a thick construction formed, for example, by casting. The clutch disks 12, 16 are splinedly fitted on an input shaft 22 of a speed change gear.

A cylindrical sleeve 24 is axially slidably fitted over a radially outer periphery of the input shaft 22. A release bearing 26 is fixed with a snap spring 26a to the sleeve 24 at the rear end thereof, that is, at the change gear side end of the sleeve 24. A bearing holder 28 is disposed over the outer periphery of the release bearing 26 to cover said bearing 26, with an abutment plate 28a fixed to the rear end of the bearing holder 28. A through-hole 28b is open through the abutment plate 28a, said input shaft 22 passing through the through-hole 28b.

Numeral 27 designates a release lever connected to a clutch pedal 27a. The release bearing 26 is axially moved by means of the release lever 27.

External spline teeth 30 are formed on the sleeve 24 in other than that part thereof on which the release bearing 26 is fitted, a retainer 32 being in spline engagement with the external spline teeth 30. The retainer 32 is stopped by a snap ring 32a against dislocation, the forward slidable range of the retainer 32 being thereby restricted.

The retainer 32 is a member formed by casting, for example, and has a generally annular configuration. The retainer 32 has an abutment portion 34 formed on its rear-side surface and along the entire circumference thereof and also has an annular groove 36 formed in a portion adjacent its front-side end. On the outer periphery of the retainer 32 there are integrally formed therewith radially outwardly extending protrusions 38 at three locations, for example, in equispaced relation.

Engagement protrusions 40 are formed on the inner surface of the clutch cover 20 integrally therewith for engagement with the protrusions 38. As can be seen from FIG. 2, two engagement protrusions 40 are provided along opposite sides of each protrusion 38, the clutch cover 20 and retainer 32 being connected together by these engagement protrusions 40 for integral rotation.

A generally disk-shaped diaphragm spring 42 is provided between the clutch cover 20 and the protrusions 38 as FIG. 1 shows. An outer peripheral portion of the diaphragm spring 42 is fixed to the clutch cover 20 by a stud pin 46 through the intermediary of two wire rings 44. The inner peripheral portion of the diaphragm spring 42 is in pressure contact with the abutment portion 34 of the retainer 32. The diaphragm spring 42, at each of its portions corresponding to the engagement protrusions 40, has a square aperture 42a formed therein to allow the corresponding engagement protrusion 40 to extend therethrough, as FIG. 2 shows.

On the inner periphery of the clutch cover 20 at a location radially outward of the diaphragm spring 42, as FIG. 1 shows, there is formed a threaded portion 20a, with which a threaded portion 48a of an adjuster ring 48 is in engagement, said adjuster ring 48 having a generally annular configuration.

The adjuster ring 48 has protrusions 50 formed on the back surface thereof at 24 locations, for example, and in circumferentially equispaced relation. The protrusions 50 are located at radially outer portions of the adjuster ring 48, and inwardly of the protrusions 50 there is defined a space 51 which allows movement of the outer peripheral portion of the diaphragm spring 42 in conjunction with release operation.

The clutch cover 20 has apertures 52 formed therein correspondingly to the protrusions 50, with a lock plate 54 fixed to each aperture 52 by a bolt 56. The lower end portion of each lock plate 54, as shown, is fitted on the corresponding protrusion 50, the adjuster ring 48 and clutch cover 20 being thereby integrally connected together in such a way that the adjuster ring 48 is axially adjustable in position.

Between the pressure plate 18 and the retainer 32 at circumferentially equispaced six locations there are disposed levers 60 (load transmission levers) for transmission of the biasing force of the diaphragm spring 42 during a release operation. An inner-side fulcrum 62 of each lever 60 is fitted in the annular groove 36 and an outer-side fulcrum 64 thereof is pressed against the front side of the adjuster ring 48, an intermediate fulcrum 66 being pressed against a fulcrum land 18a of the pressure plate 18. The lever ratio between these fulcrums 62, 64, 66, inner-side, outer-side, and intermediate, is set at L1:L2.

Figure 1A:
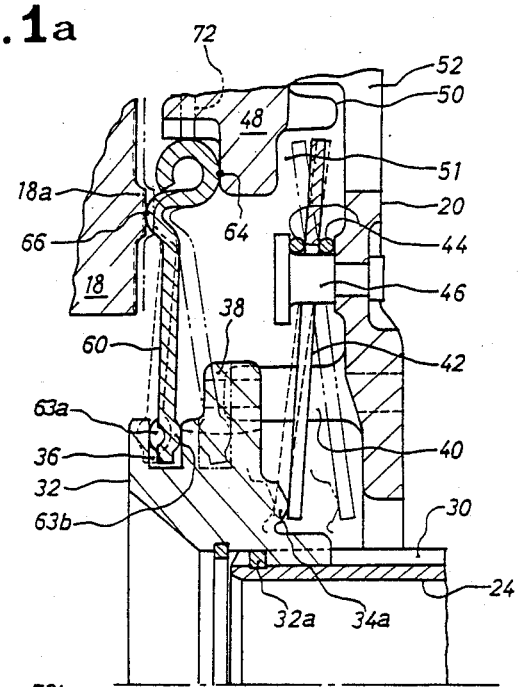
FIG. 1a is a fragmentary enlarged view of the clutch in FIG. 1.
Figure 1B:
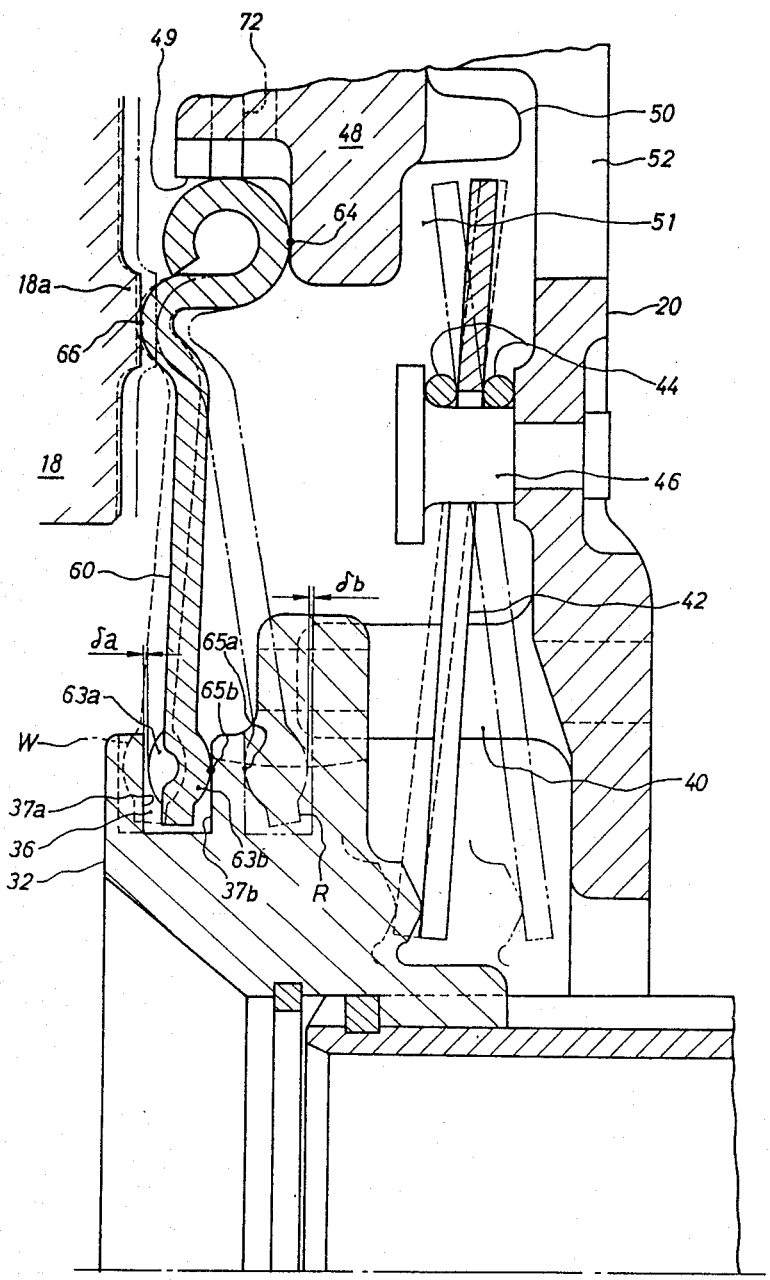
FIG. 1b is a further enlarged fragmentary view of the FIG. 1 arrangement.

The inner-side fulcrum 62, as shown in FIG. 1a which is a fragmentary enlarged view of the FIG. 1 arrangement and also in FIG. 1b which is a further enlarged view, consists of a forwardly projecting front protrusion 63a and a backwardly projecting rear protrusion 63b. The front and rear protrusions 63a, 63b, as will be described in further detail hereinafter, are formed by press working, for example, so that they are generally arch-shaped or of a generally arcuate sectional configuration.

Figure 6:
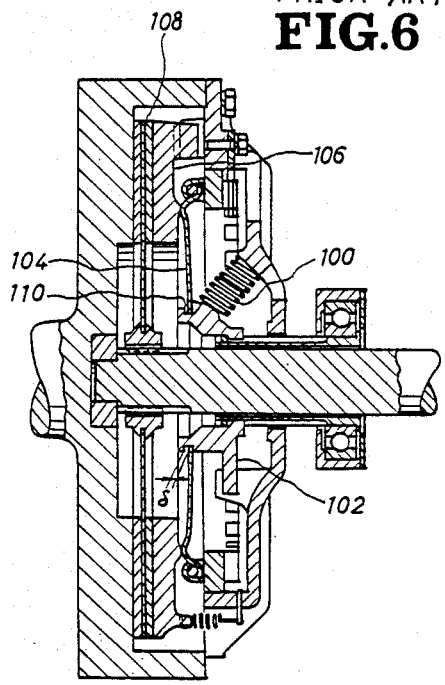
FIG. 6 longitudinal section showing a conventional arrangement.

Abutment surfaces 37a, 37b of the annular groove 36 against which said front protrusion 63a and rear protrusion 63b are pressed respectively are spaced by clearances δa and δb respectively from the front protrusion 63a and rear protrusion 63b, said clearances δa and δb as a whole being of the order of about one half the clearance δ required in the prior-art arrangement (FIG. 6). Further, it is noted that the clearance δa is set slightly smaller than the clearance δb.

Accordingly, at each time of clutch engagement when the rear protrusion 63b is pushed forward by the abutment surface 37b (or in the condition as shown by a solid line in FIGS. 1a and 1b), the biasing force of the diaphragm spring 42 is transmitted from a contact point 65b, while at each time of clutch release when the front protrusion 63a is pushed rearward by the abutment surface 37a (or in condition R shown by a two-dot chain line), the lever 60 is lifted by a contact point 65a.

Each lever 60 described above is made of sheet metal, for example, in such a way that, as FIG. 2 shows, two cutting plane lines 68 are cut in a front end portion (or an outer portion relative to the clutch radius) of a lever 60 blank so that outer pieces 70 defined by said lines 68 are bent to form said outer-side fulcrums 64 (FIG. 1), while a median piece 72 formed between the outer pieces 70 and extending radially outward is allowed to extend into a recess 48b formed in the adjuster ring 48. Lever 60 blank, inward of outer pieces 70, FIG. 4, is bent to form intermediate fulcrum 66.

Figure 2A:
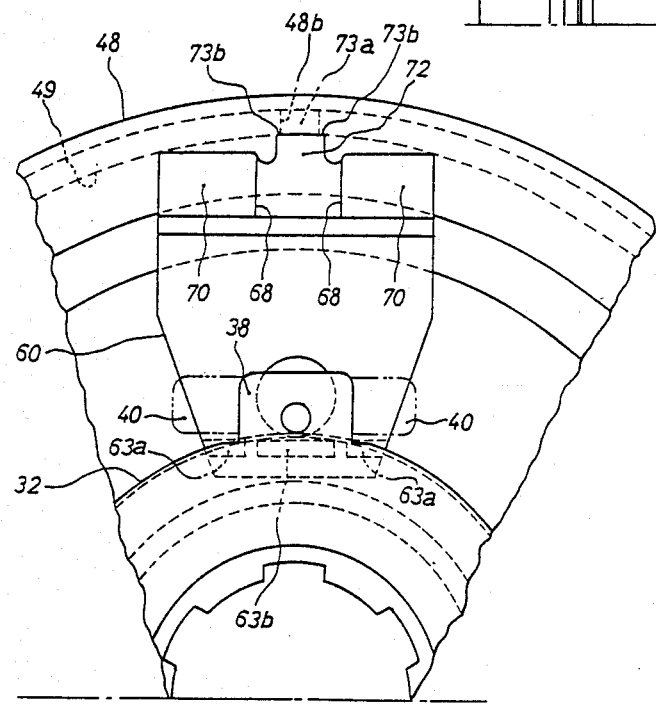
FIG. 2a is an enlarged view of a portion of FIG. 2.
Figure 2:
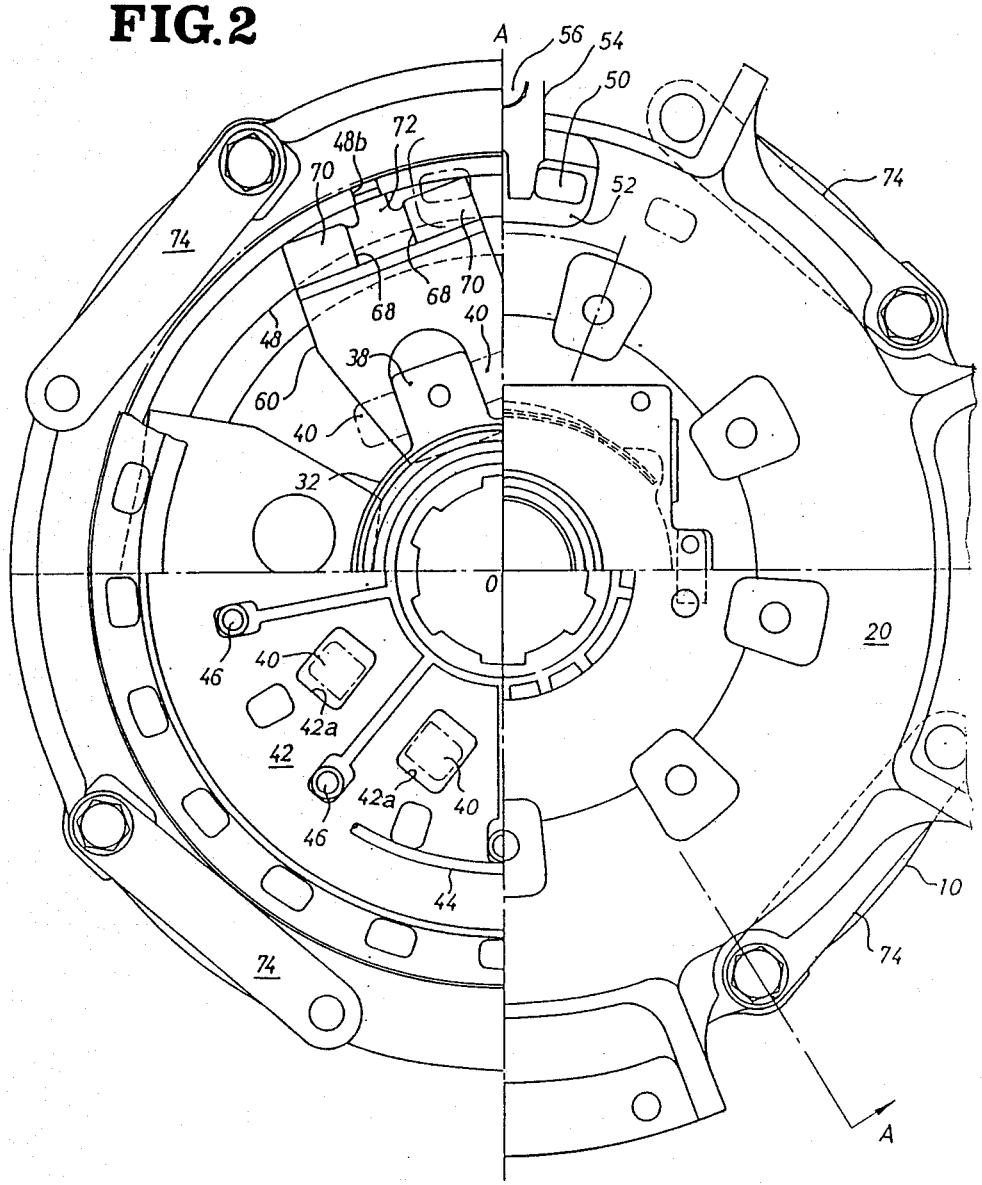
FIG. 2 is a view taken in the direction of the arrow II in FIG. 1.

As FIG. 2a, an enlarged fragmentary view of the FIG. 2 arrangement, shows, the front end portion of the median piece 72 forms a holding projection 73a per se and this holding projection 73a is fitted in the recess 48b to hold the lever 60 in the circumferential directions of the clutch. At both sides of the holding projection 73a there are formed stepped portions 73b which engage the edge portion of the recess 48b. The stepped portions 73 are configured in an arcuate pattern along the inner periphery 49 of the adjuster ring 48, the lever 60 being positioned by the stepped portions 73b in the radial direction of the clutch.

Figure 4:
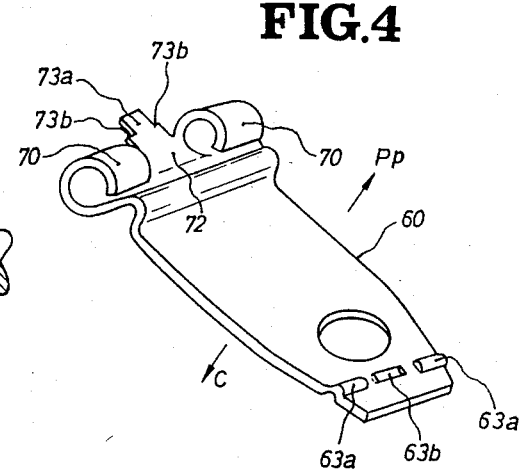
FIG. 4 is a perspective view of a lever.

Further, as FIG. 4 shows, aforesaid front protrusions 63a and rear protrusions 63b are formed on the base portion of the lever 60 (radially inwardly of the clutch). The front protrusions 63a, formed at widthwise opposite extremities of the lever base portion, project in the direction of the arrow Pp (i.e., toward the pressure plate 18 in FIG. 1), while the rear protrusion 63b, formed centrally between the front protrusions 63a, projects in the direction of the arrow C (i.e., toward the clutch cover 20). The front and rear protrusions 63a, 63b are arranged on a line perpendicular to the longitudinal direction of the lever 60, so that the contact points 65a, 65b (in FIG. 1b) may come into line contact with each other.

In the above described embodiment, the front and rear protrusions 63a, 63b are formed by pressing in such a way that they have a sectional configuration of a generally arcuate shape; alternatively, however, they may be so configured, for example, that they are of a generally V-shaped section.

As FIG. 1 shows, strap plates 74 of a known type which extend in the circumferential direction are disposed between the outer peripheral portion of the pressure plate 18 and the clutch cover 20 and at four circumferentially equispaced locations.

Further, in FIG. 1, an inertia brake 78 is interposed between the abutment plate 28a and a speed change gear-side end 76, said brake 78 being splinedly fitted on the input shaft 22. The inertia brake 78 has at both sides thereof facings 80 and 82, with a release allowance Rr provided between the facing 82 and the abutment plate 28a.

(Function of the Invention)

Function of the above described embodiment will now be explained. As FIG. 1b shows, the clearances δa, δb provided respectively between the front and rear protrusions 63a, 63b of the lever 60 and the abutment surfaces 37a, 37b of the annular groove 36 are as a whole of the order of about one half of the clearance δ provided in the prior-art arrangement (FIG. 6). Therefore, the arrangement according to the invention provides an improved release efficiency. That is, as can be seen from FIG. 5 which shows the relationship between stroke S of the release lever 27 (in FIG. 1) and lift Y of the pressure plate 18 (in FIG. 1), the release characteristic 88 in the case of the FIG. 1 arrangement has a definite advantage over the release characteristic in the case of the prior-art arrangement, with a release loss lowered from Lo 1 to Lo 2 and a gain in lift Y by an increment $\Delta y$.

At the time of setting in an initial state as shown by solid line in FIG. 1, the biasing force P of the diaphragm spring 42 presses the abutment portion 34 of the retainer 32 forward. This biasing force P is transmitted through the inner-side fulcrum 62 of the annular groove 36 to lever 60, whereupon the force P is magnified at the lever ratio of L1 : L2 to as much as about three times the force, for example, for transmission through the intermediate fulcrum 66 to the fulcrum land 18a for pressing the clutch disks 12, 16.

In this initial state the diaphragm spring 42 is held in a generally flat position and, therefore, even in the case of high speed operation the diaphragm spring 42 is little affected by any centrifugal force acting thereon, there being no possibility of the pressing force on the clutch disks 12, 16 being reduced by the influence of the centrifugal force.

As the clutch disks 12, 16 are worn away in the course of long-term use thereof, the pressure plate 18 shifts forward and the retainer 32 also shifts in the like manner. When such wear occurs, the diaphragm spring 42 takes position W as shown by broken line in FIG. 1. In this state, the radially outer portion of each lever 60 assumes a backwardly tilted position; so, the lock plate 54 is removed and then the adjuster ring 48 is screwed forward to maintain the lever in position.

Figure 3:
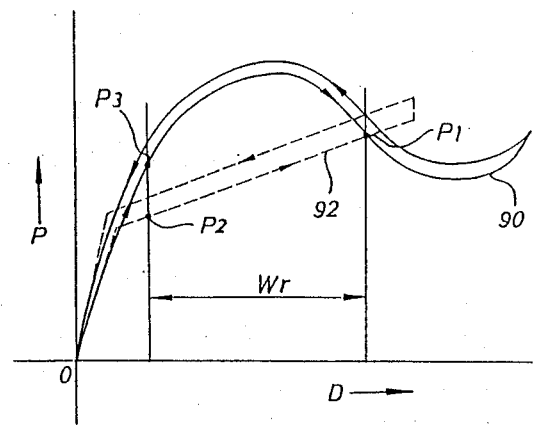
FIG. 3 a graph showing the relationship between biasing force of a diaphragm spring and deformation.

Now, spring characteristics 90 of the diaphragm spring 42, as may be seen from FIG. 3 which shows the relationship between deformation D and spring force P, are such that they show an upward covex pattern within the scope of a wearing allowance Wr corresponding to the quantity of wear of the clutch disks 12, 16; therefore, the spring force P from the diaphragm spring 42 is greater than the level of spring characteristics 92 of the coil spring 100 in the prior-art arrangement (FIG. 6), and thus the pressing force of the pressure plate 18 on the clutch disks 12, 16 is greater than that in the case of the prior-art arrangement.

In the case of characteristics 92, as the clutch disks 12, 16 are worn away, the spring force P tends to decrease from setting load P1 to wearing load P2, whereas in the case of characteristics 90 such decrease is very limited, that is, from setting load P1 to wearing load P3 as shown. In other words, according to the arrangement of the invention, load generation in the case of the clutch disks 12, 16 being worn away, or the so-called wearing load is greater than that conventionally obtainable. In addition, by virtue of aforesaid characteristics 90, the releasing force required for a releasing operation is appreciably reduced, which fact means less stepping force required to be applied on the clutch pedal.

It is also noted that at the time of such wearing, as FIG. 1b illustrates, the front protrusion 63a of each lever 60 shifts forward to position W, but still there is present a clearance $\delta a$ between the front protrusion 63a and the abutment surface 37a, the lever 60 being thus in no way prevented from functioning.

At the time of release operation when the clutch pedal is stepped on, the release bearing 26 is moved backward by the release lever 27 and the sleeve 24 is caused to slide in conjunction with the release bearing 26. As the sleeve 24 slides, the retainer 32 held in position by the snap ring 32i a is pulled backward against the spring force P of the diaphragm spring 42, whereupon the diaphragm spring 42 is brought to condition R in FIG. 1. Then, the inner-side fulcrum 62 of lever 60 is shifted backward through pivotal movement of the lever 60 at its outer-side fulcrum 64, and accordingly the intermediate fulcrum 66 is also shifted backward. Thus, the pressure plate 18 is moved backward under the spring force of the strap plate 74, the clutch disks 12, 16 being thereby released from the state of being pressed.

During this release operation the rear protrusion 63b of the lever 60 is spaced apart from the abutment surface 37b by clearance $\delta b$, thus there being no possibility of the lever 60 being prevented from functioning.

(Effect of the Invention)

Figure 5:
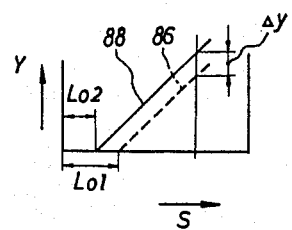
FIG. 5 is a graph showing the relationship between release lever and pressure plate lift.

As above described, the load transmission lever for a pull-type clutch is accordance with the invention is such that the or each lever 60, as FIG. 1b illustrates, has front and rear protrusions 63a, 63b formed on its base end portion, said protrusions 63a, 63b being adapted to be spaced from the abutment surfaces 37a, 37b of the annular groove 36 respectively by clearances $\delta a$, $\delta b$ which are as a whole smaller than clearance $\delta$ in the prior-art arrangement (FIG. 6). Therefore, as FIG. 5 shows, release loss Lo 1 can be reduced to release loss Lo 2, and lift Y of the pressure plate 18 (FIG. 1) can be increased by an increment $\Delta y$, it being thus possible to obtain an improved release efficiency.

Moreover, if the clutch disks 12, 16 are worn away, the front protrusion 63a of lever 60 is shifted forward to position W, but still it is spaced by clearance $\delta a$ from the abutment surface 37a, there being no possible interference with the operation of the lever 60. Thus, the operation of the lever 60 can be maintained in normal condition. Similarly, during release operation, the rear protrusion 63b of the lever 60 is spaced by clearance $\delta b$ from the abutment surface 37b, it being thus possible to maintain the operation of the lever 60 in order.

Furthermore, the fact that contact points 65a, 65b are so formed as to have a line contact with the abutment surfaces 37a, 37b contributes to minimizing the wear of the front and rear protrusions 63a, 63b and the abutment surfaces 37a, 37b.

Especially where each lever 60 is provided at its front end portion with a median piece 72 having a holding projection 73a formed thereon for being fitted in a recess 48b, with stepped portions 73b brought into engagement with the edge portions of the recess 48b, the entire lever 60 can be held by the holding projection 73a in the circumferential directions and can be positioned by means of the stepped portions 73b in the radial direction of the clutch.

(Other embodiment)

Figure 5A:
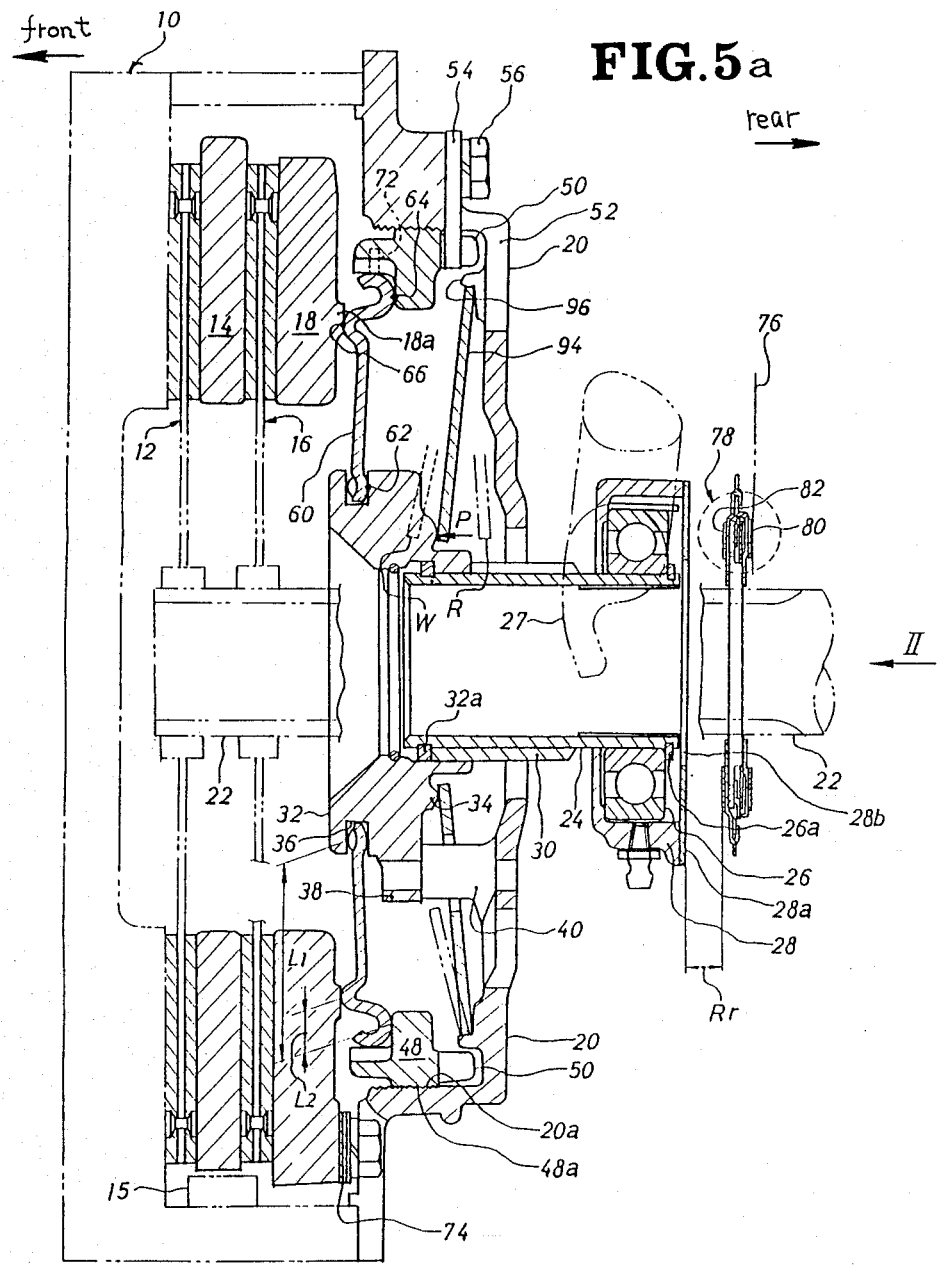
FIG. 5a is a longitudinal sectional view of another embodiment of invention.

This invention is not limited to the foregoing one embodiment, but may be applicable to such pull-type clutch as illustrated in FIG. 5a, for example, wherein a cone spring 94 is employed in place of the diaphragm spring 94, said cone spring 94 being held in position by means of an annular protrusion 96. In FIG. 5a, it is to be noted, parts shown by same reference characters as in FIG. 1 designate identical or corresponding parts.

What is claimed is:

1. In a pull-type clutch including a release lever connected to a clutch pedal and adapted to pull a release bearing away from a flywheel for disengaging said clutch and for releasing said release bearing for movement toward said flywheel when said clutch is to be engaged, said release bearing being fixed to a sleeve at a transmission-side end of said sleeve, a load transmission retainer fixed to said sleeve at a flywheel end of said sleeve and load transmission levers disposed between said retainer and a pressure plate of said clutch, said retainer having an annular groove having a front-side abutment surface extending in a radial direction at a flywheel-side of said groove and a rear-side abutment surface spaced from said front-side abutment surface and extending in a radial direction at the opposite side of said groove, each lever of said load transmission levers having protrusions projecting from the front-side and the rear-side of said lever at the retainer end portion of said lever for engagement with said front-side abutment surface and said rear-side abutment surface, respectively, of said groove, said front-side and rear-side protrusions projecting toward said front-side and said rear-side abutment surfaces of said annular groove, respectively, for pressure contact therewith, said front-side and said rear-side protrusions being circumferentially spaced from each other, said front-side protrusions being spaced from said front-side abutment surface of said retainer annular groove by a pre-set clearance when said rear-side protrusions are in engagement with said rear-side abutment surface of said retainer annular groove and said clutch is engaged and said rear-side protrusions being spaced from said rear-side abutment surface of said retainer annular groove by a pre-set clearance when said front-side protrusions are in engagement with said front-side abutment surface of said retainer annular groove and said clutch is disengaged.

2. In a pull-type clutch as set forth in claim 1, wherein said protrusions are of an elongate configuration linearly perpendicular to said lever.

3. In a pull-type clutch as set forth in any one of claims 1 or 2, wherein said protrusions are of an arcuate sectional configuration.

4. In a pull-type clutch as set forth in any one of claims 1 or 2, wherein each of said load transmission levers has a holding projection formed at the end of each said lever opposite said retainer end for holding said lever in position, said holding projection being fitted in a recess formed in a adjuster ring disposed radially outwardly of said lever for adjustment of said levers to compensate for wear of said clutch, said holding projection having stepped portions formed at sides thereof for engagement with the edge portion of said recess for positioning said load transmission lever in the radial direction of the clutch.

5. In a pull-type clutch as set forth in claim 3, wherein each of said load transmission levers has a holding projection formed at the end of each said lever opposite said retainer end for holding the lever is position, said holding projection being fitted in a recess formed in a adjuster ring disposed radially outwardly of said lever for adjustment of said lever to compensate for wear of said clutch, said holding projection having stepped portions formed at sides thereof for engagement with the edge portion of said recess for positioning said load transmission lever in the radial direction of the clutch.

6. In a pull-type clutch as set forth in any one of claims 1 or 2, wherein each of said load transmission levers has two cutting plane lines cut at the end portion thereof opposite said base end and extending generally in the radial direction, a portion between said cutting plane lines extending radially outwardly and formed into a holding projection, portions at both sides of said each said lever at said end portion opposite said base end being bent to form outer-side fulcrums and a portion of each said lever inward of said outer-side fulcrums bent to form an intermediate fulcrum of said lever.

7. In a pull-type clutch as set forth in claim 3, wherein each of the load transmission levers has two cutting plane lines cut at the end portion thereof opposite said base end and extending generally in the radial direction, a portion between said cutting plane lines extending radially outwardly and formed into a holding projection, portions of each said lever at opposite sides of said holding projection being bent to form outerside fulcrums and a portion of each said lever inward of said outer-side fulcrums bent to form an intermediate fulcrum of said lever.

8. In a pull-type clutch as set forth in claim 4, wherein each of said load transmission levers has two cutting plane lines cut at the end of each said lever opposite said base end and extending generally in the radial direction, a portion between said cutting plane lines extending radially outwardly and formed into said holding projection, portions of each said lever at opposite sides of said holding projection being bent and forming outer fulcrums and a portion of each of said lever inward of said outerside fulcrums bent to form an intermediate fulcrum of said lever.

* * * * *